US012811303B2

(12) United States Patent
Lam et al.

(10) Patent No.: US 12,811,303 B2
(45) Date of Patent: Nov. 24, 2026

(54) ULTRA-WIDEBAND DUAL POLARIZED ANTENNA

(71) Applicant: Lockheed Martin Corporation, Bethesda, MD (US)

(72) Inventors: Tommy H. Lam, Apalachin, NY (US); Karolyn Kay Spencer, Binghamton, NY (US); Paul Joseph Gaylo, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/954,328

(22) Filed: Nov. 20, 2024

(65) Prior Publication Data

US 2026/0142378 A1 May 21, 2026

(51) Int. Cl.
*H01Q 13/18* (2006.01)
*H01Q 5/307* (2015.01)

(52) U.S. Cl.
CPC ............. *H01Q 13/18* (2013.01); *H01Q 5/307* (2015.01)

(58) Field of Classification Search
CPC .......... H01Q 13/18; H01Q 5/307; H01Q 9/27; H01Q 1/36; H01Q 5/25; H01Q 21/24; H01Q 25/001
See application file for complete search history.

(56) References Cited

U.S. PATENT DOCUMENTS

| | | | | |
|---|---|---|---|---|
| 7,692,603 | B1 * | 4/2010 | Cencich, Sr. ............ | H01Q 1/36 343/895 |
| 8,130,162 | B2 | 3/2012 | Kildal | |
| 9,437,929 | B2 | 9/2016 | Isom et al. | |
| 10,680,323 | B2 | 6/2020 | Zhang et al. | |
| 10,819,042 | B2 | 10/2020 | Xia et al. | |
| 10,826,186 | B2 | 11/2020 | Irion, II | |
| 10,903,556 | B2 | 1/2021 | Lam et al. | |
| 11,018,430 | B2 | 5/2021 | Kildal et al. | |
| 2017/0062940 | A1 | 3/2017 | Cao | |
| 2021/0273339 | A1 | 9/2021 | Fenn et al. | |
| 2021/0305722 | A1 | 9/2021 | Zhang et al. | |
| 2023/0223709 | A1 | 7/2023 | Guntupalli et al. | |

FOREIGN PATENT DOCUMENTS

| | | |
|---|---|---|
| CN | 105281021 A | 1/2016 |
| CN | 117293560 A | 12/2023 |

* cited by examiner

*Primary Examiner* — Michael M Bouizza
(74) *Attorney, Agent, or Firm* — Michael Best & Friedrich LLP

(57) ABSTRACT

Systems related to an ultra-wideband dual polarization antenna system. One system includes a first rounded-cornered square planar antenna face, a first plurality of radiating element traces, each of the first radiating element traces extending flexuously from a center of the first rounded-cornered square planar antenna face to a corner edge of the first rounded-cornered square antenna face, and a first plurality of ridged antenna elements electrically coupled to each of the first plurality of radiating element traces extending upward from the first rounded-cornered square planar antenna face. Each of the first plurality of antenna elements are positioned along an edge of the first rounded-cornered square planar antenna face.

20 Claims, 11 Drawing Sheets

ULTRA-WIDEBAND DUAL POLARIZED ANTENNA

FIELD

Examples described herein generally relate to broadband (including ultra-wideband) dual polarized antennas.

SUMMARY

Broadband antenna systems generally refer to systems that are able to transmit and/or receive radio frequency communications over a generally wide range of frequencies. Ultra-wideband (UWB) antenna systems are systems that have a radio frequency bandwidth that is multi-octaves (for example, flow to ten times flow). UWB antenna may be preferred for high-throughput wireless communication systems, such as cellular and satellite systems, as well as radar, electromagnetic countermeasure, and multifunctional (communications/sensing) systems, for example, for location tracking applications. Each application may differ in its desired radiation characteristics of the antenna. Hence, UWB antenna designs (and radiation characteristics thereof) vary between applications.

The examples described herein generally relate to an ultra-wideband dual polarization antenna. One example implementation provides an ultra-wideband dual polarization antenna system. The system includes a first rounded-cornered square planar antenna face, a first plurality of radiating element traces, each of the first radiating element traces extending flexuously from a center of the first rounded-cornered square planar antenna face to a corner edge of the first rounded-cornered square antenna face, and a first plurality of ridged antenna elements electrically coupled to each of the first plurality of radiating element traces extending upward from the first rounded-cornered square planar antenna face. Each of the first plurality of antenna elements are positioned along an edge of the first rounded-cornered square planar antenna face.

Figure 1A:
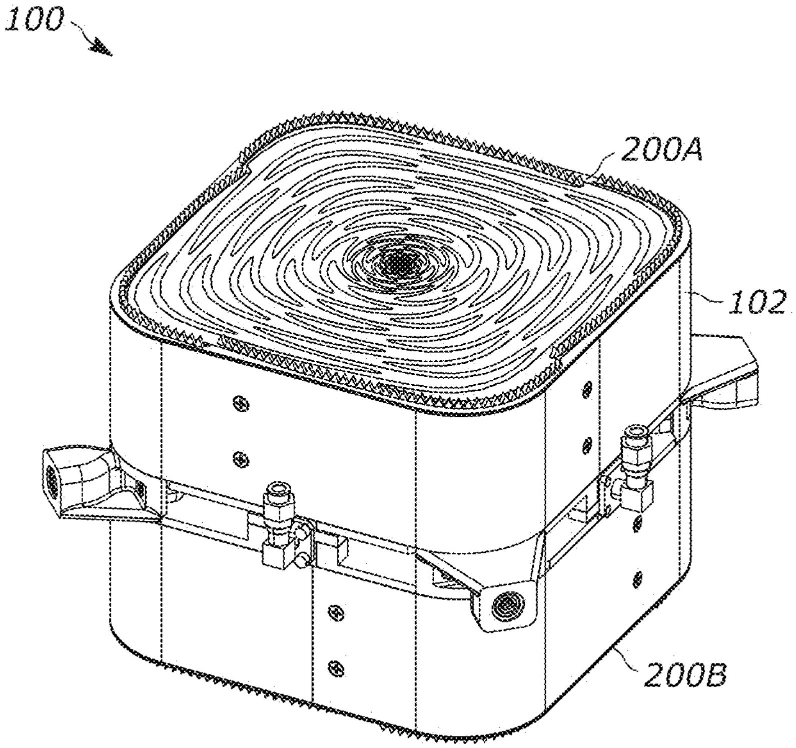
FIG. 1A is a dual polarization antenna system including a housing according to some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The examples described herein generally related to a broadband (for example, ultra-wideband) dual polarization antenna. Traditional dual polarization antennas may be unsuitable for certain applications due to, for example, insufficient instantaneous bandwidth, insufficient radiation efficiency, no rotationally symmetric radiation pattern, insufficient cross polarization, unstable electrical phase centers, and the like. Furthermore, many commercialized off-the-shelf dual polarization antennas provide only a single radiation beam. Thus, in applications where dual beams are required, more than one antenna unit may be necessary. As described below, the antenna system described herein is a dual polarization antenna with near-phase match, stable electrical phase center, and, in some implementations, includes a second antenna for dual beam applications. The antenna system, in some implementations, is relatively compact in size (for example, approximately 5 inches long by 5 inches wide by 4.25 inches). The compact design may also reduce production cost and may be easier to assemble during manufacturing. The system may also provide improved antenna gain and efficiency (for example, 8 dB more antenna gain at 2 GHz and approximately twice the frequency band for antennas operating in a 0.7-18 GHz range).

Before any implementations are explained in detail, it is to be understood that the implementations described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware and/or hardware. For example, instead of being located within and performed by a single electronic processor, logic and processing described herein may be distributed among multiple electronic processors. Similarly, one or more memory modules and communication channels or networks may be used even if examples and implementations described or illustrated herein have a single such device or element. Also, regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

FIG. 1A illustrates an example ultra-wideband dual polarization antenna system 100 in accordance with some implementations. The dual polarization antenna system 100 includes a housing 102 and an antenna face 200A (having a first field of view) disposed on a first side of the antenna system 100. In the examples illustrated and described herein, a second antenna face 200B (having a second field of view) is disposed on a second side of the antenna system 100. Hence, the antenna system 100, as illustrated and described herein is a dual beam antenna system (i.e., having two antennas, for example, antenna faces 200A and 200B, each having a respective radiation beam). The field of view of the antenna face 200B, in some implementations, is in a direction opposite to that of the field of view of the antenna face 200A. Both antenna faces 200A and 200B (singularly referred to herein as antenna face 200) may be configured similarly. As explained in more detail below, each antenna face 200A, 200B is configured to be operated as a dual polarization antenna. In some implementations, the antenna face 200 is operated as a transmitter, a receiver, or both (i.e., a transceiver).

Although described herein as a dual beam, dual polarization antenna system, the antenna system 100, in some embodiments, may be a single dual beam polarization antenna system having a singular antenna face 200 with a single field of view.

It should be understood that the system 100 is provided and described herein as an example and, in some implementations, the system 100 may include additional components. For example, the system 100 may include additional antenna components including tuners, reflectors, absorbers, electronic signal processors, or combinations thereof in various configurations and which, for sake of brevity, are not explicitly described herein.

In the examples illustrated and described herein, the antenna system 100 is a small-scale antenna system (for example, the size of the antenna face 200 may be approximately 5 inches by 5 inches and the height of the housing 102 may be approximately 4.25 inches). However, it should be understood that the system 100 (in particular, the antenna face 200) may be scaled to be larger or smaller depending, for example, on the particular use application. For example, in applications where a larger frequency (wavelength) is desired, the antenna system 100 may be scaled (for example, for a frequency range of 0.1 GHz to 2.57 GHz, the size of the antenna face 200 may be approximately 35 inches by 35 inches). In the example embodiments described herein, the antenna face is described as covering approximately 5 octaves or more than one decade (in particular, 0.7 GHz to 18 GHz or 1:25.7 bandwidth ratio).

Figure 2:
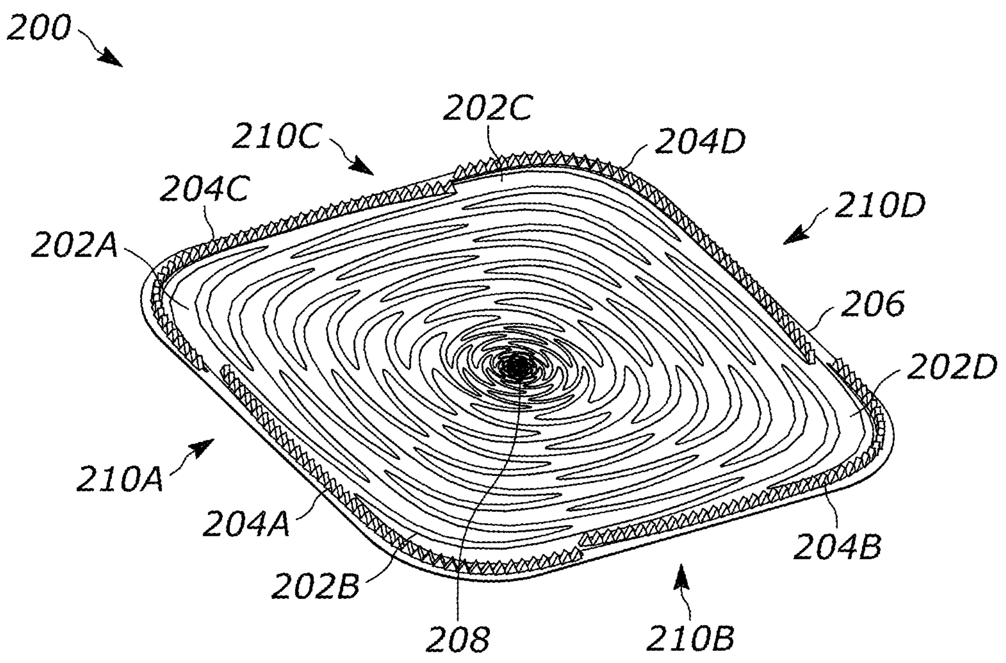
FIG. 2 is an antenna face of the dual polarization antenna system of FIGS. 1A-1D according to some implementations.

FIG. 2 illustrates an example antenna face 200 in accordance with some implementations. The antenna face 200 is a rounded-cornered square shaped planar antenna and includes a plurality of conductive radiating element traces 202A-202D and a plurality of conductive ridged antenna elements 204A-204D disposed on a substrate 206. The plurality of radiating element traces 202A-202D each extend flexuously (for example, in a rounded zig-zag pattern increasing in amplitude over geometric distance as illustrated in FIG. 2) from a center 208 of the antenna face 200 towards a respective edge of the antenna face 200.

The semi-square shape of the antenna face 200 provides additional element length for the traces 202A-202D within a given square volume, which may provide for additional antenna frequency performance. However, it should be understood that other shapes may be used. In some applications, a semi-square shape of the antenna face 200 may be advantageous in terms of beamwidth on all axes around the antenna face 200 (for example, symmetric beamwidth) compared to other shapes. For example, the radiation pattern on the length axis (for example, the 5-inch axis) would be matched to the width axis (for example, the 5-inch width axis). Thus, the radiation pattern on either of the length axis or the width axis would be the same. By symmetry, beamwidth on other axes (for example, the diagonal axis) would also be very similar. This may be advantageous in applications where the antenna face 200 is aimed upward in the zenith direction (sky direction). In such instances, the antenna face 200 will provide almost equal amplitude around the zenith axis in all azimuth directions (in other words, nearly equal amplitude coverage around all azimuth angles). Rectangular shapes may not provide such equal bandwidth properties in some applications, and circular shapes may require a larger overall size to have equal antenna radiation efficiency as compared to square or semi-square shape.

Each of the ridged antenna elements 204A-204D comprise a series of triangular (also referred to as sawtooth-shaped) teeth or ridges extending vertically outward from the antenna face 200. The ridged antenna elements 204A-204D are each electrically coupled and disposed at an end of a respective trace 202A-202D. Each of the ridged antenna elements 204A-204D are configured such that they follow the flexuous pattern of the respective trace 202A-202D up to a respective corner of the antenna face 200. The ridged antenna elements 204A-204D follow the respective curved corner of the antenna face 200 as illustrated in FIG. 2. The ridged antenna elements 204A-204D are configured to provide additional electrical phase delay (for example, to extend lower frequency performance than the physical size of the antenna face 200 allows). In some embodiments, for each of the ridged antenna elements 204A-204D, a plurality of triangular teeth at a first end of the respective series are solid (i.e. not hollow). Following the plurality of solid teeth, each of the remaining teeth within the series extending to a second end of the series are successively more hollow than the previous (i.e., each sequential tooth has a larger open-faced cavity beneath it (between the tooth itself and the surface of the antenna face 200)). Such a series of solid and air-filled teeth may provide more capacitance at the beginning of the series and less capacitance at the end. This may allow for the line impedance be lower (more capacitance) and gradually taper to higher impedance (less capacitance). Such a line impedance taper at the end of the antenna element 204A-204D may allow for higher antenna radiation efficiency for a given antenna size dimension.

Each element trace 202A-202D and the respective ridged antenna element 204A-204D coupled to the element trace 202A-202D are each respectively referred to herein as an antenna path (for example, antenna paths 210A-210D). In some implementations, both the radiating element traces 202A-202D and the ridged antenna elements 204A-204D are made from the same conductive material (for example, copper). As explained in more detail below, a first pair of antenna paths (for example, path 210A, including element trace 202A and ridged antenna element 204A, and path 210D, including element trace 202D and ridged element 204D) form a first antenna pair and are configured to be connected to a first feed line (via dual balun connector 300 described in more detail below) and are operable for transmission and reception of radio signals along a first polarization (for example, horizontal). The other second pair of antenna paths (for example, path 210B, including element trace 202B and ridged antenna element 204B, and path 210C, including element trace 202C and ridged element 204C) are configured to be connected to a second feed line (via dual balun connector 300 described in more detail below) form a second antenna pair 212B and are operable for transmission and reception of radio signals along a second polarization (for example, vertical).

Figure 1B:
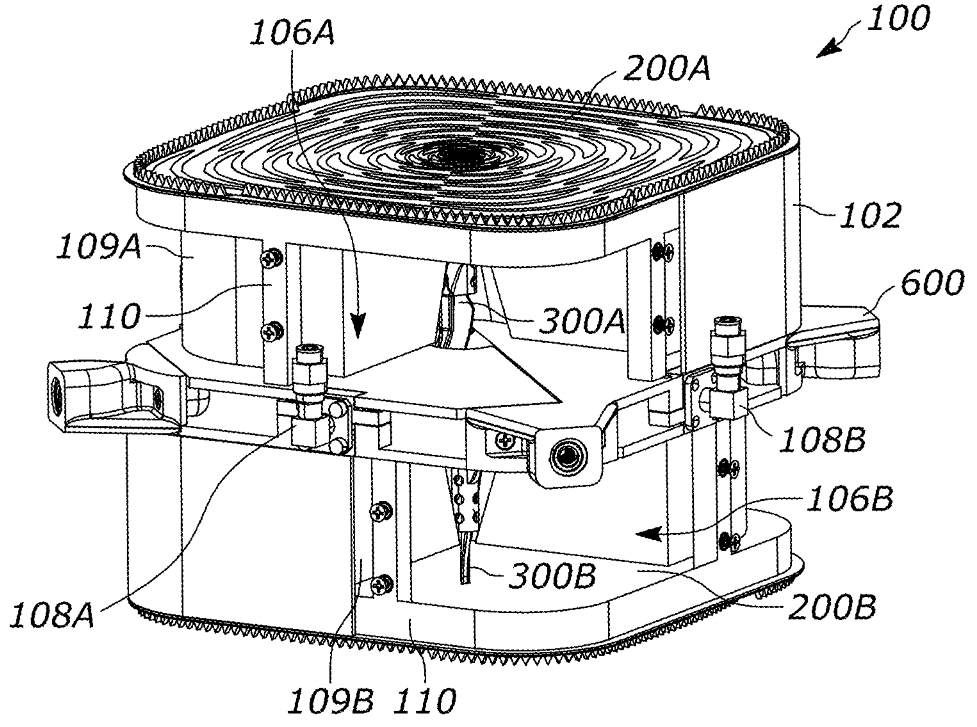
FIG. 1B is the dual polarization antenna system of FIG. 1A without a portion of the housing according to some implementations.
Figure 1C:
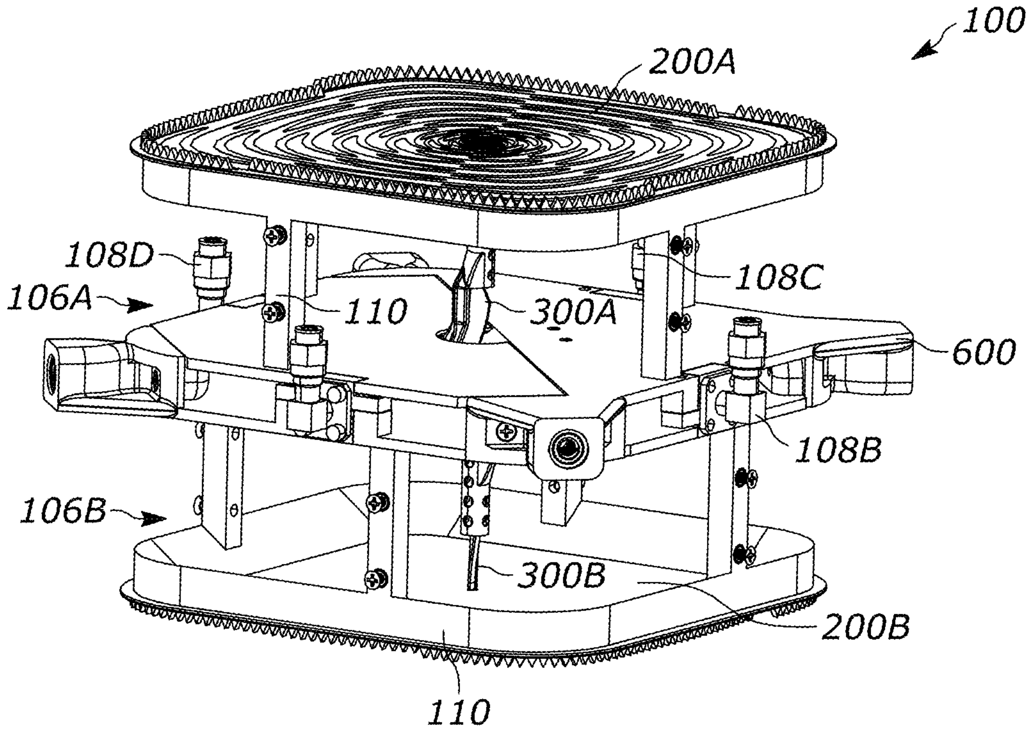
FIG. 1C is the dual polarization antenna system of FIG. 1A without the housing according to some implementations.

Returning to FIG. 1A, the housing 102, in some implementations, comprises a plurality of panels (for example, panels 104A-104D) and, thus, may provide easier accessibility to components of the system 100 disposed within the housing 102. FIG. 1B illustrates an example dual polarization antenna system 100 without a portion of the housing 102 in accordance with some implementations. FIG. 1C illustrates an example dual polarization antenna system 100 without the housing 102 in accordance with some implementations. As illustrated in FIGS. 1B and 1C, within the housing 102, the antenna system 100 includes dual balun connectors 300A and 300B and a center shelf 500.

Figure 1D:
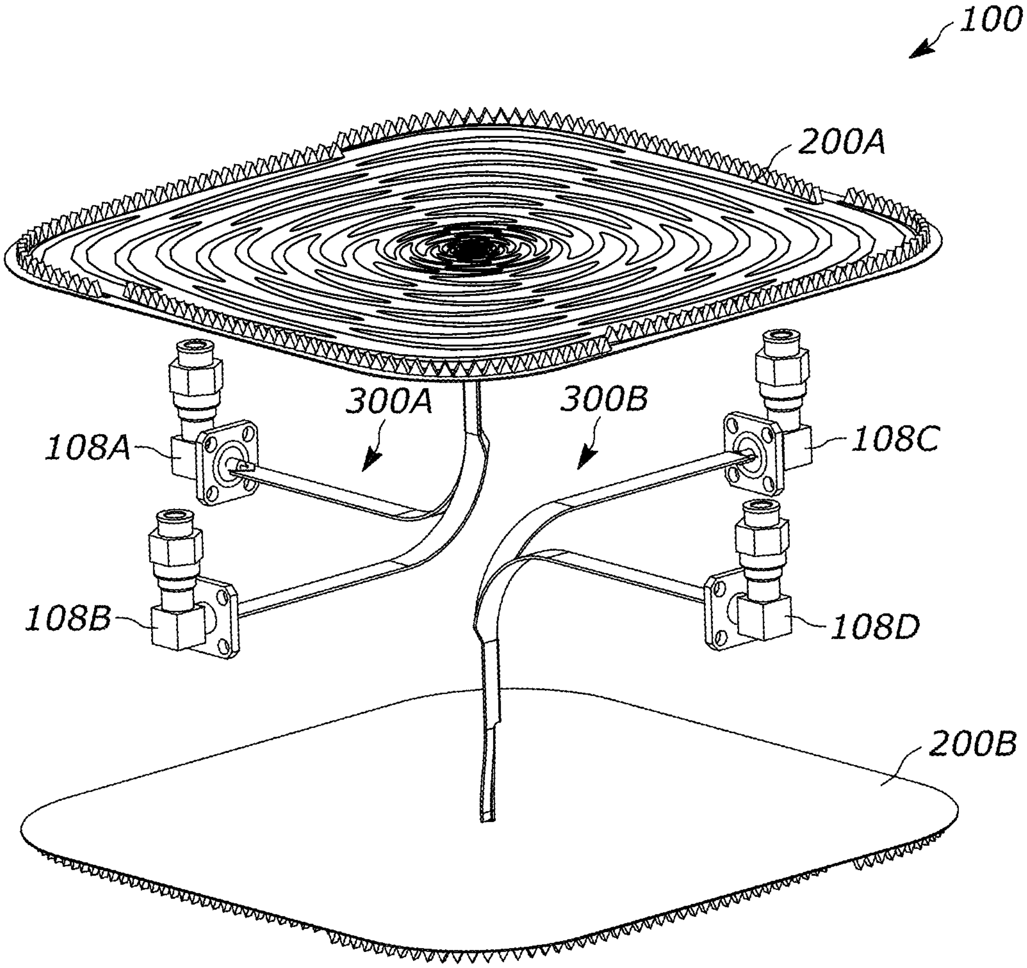
FIG. 1D is the dual polarization antenna system of FIG. 1A without the housing according to some implementations.

FIG. 1D illustrates the antenna faces 200A and 200B and dual balun connectors 300A and 300B of the antenna system 100 in accordance with some implementations. Both dual balun connectors 300A and 300B are configured similarly and are singularly referred to herein as dual balun connector 300. The dual balun connectors 300A and 300B each include a single flexible printed circuit or wiring board (PWB) 301A and 301B (singularly referred to herein as PWB 301) and a pair of baluns 108A, 108B and 108C, 108D, respectively. In some implementations, one or more of the baluns 108A-108D are positioned outside of the housing 102. For example, in the illustrated implementation, the baluns 108A-108D are positioned outside of the housing 102.

Figure 3A:
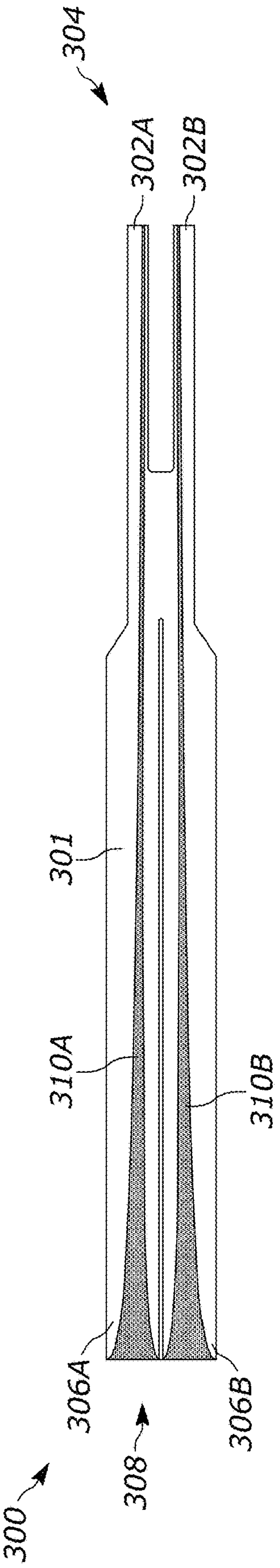
FIG. 3A is a dual balun connector of the dual polarization antenna system of FIGS. 1A-1D according to some implementations.
Figure 3B:
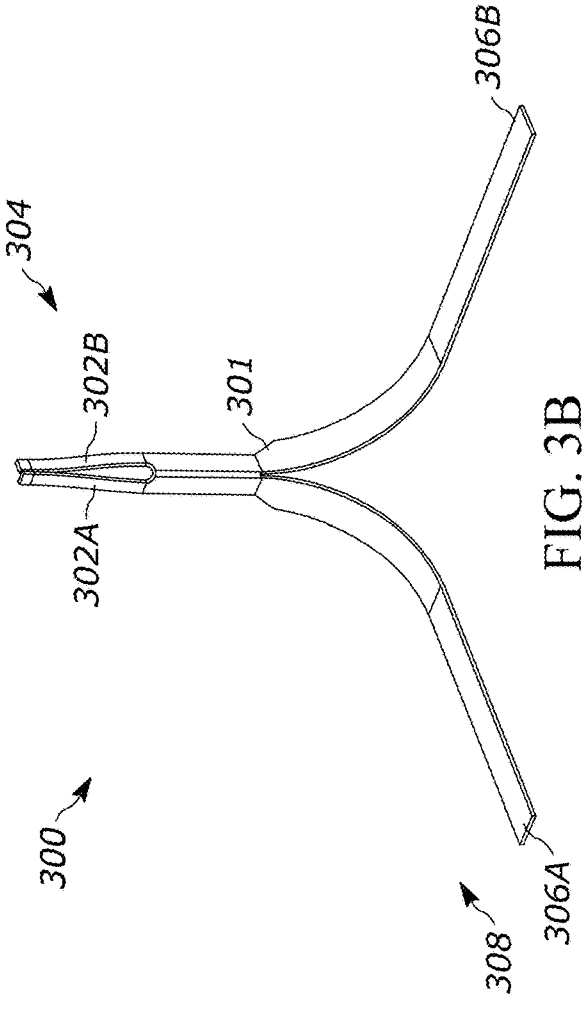
FIG. 3B is the dual balun connector of the dual polarization antenna system of FIGS. 1A-1D according to some implementations.

FIGS. 3A and 3B illustrate the PWB 301 of the dual balun connector 300 in accordance with some implementations. The dual balun connector 300 includes a first pair of contacts 302A and 302B at a first end 304 of the PWB 301 and a second pair of contacts 306A and 306B at a second end 308 of the connector 300. In the illustrated example, the contacts 302A and 306A are electrically connected to each other (for example, via a trace 310A) and the contacts 302B and 306B are electrically connected to each other (for example, via a trace 310B). Each contact 306A and 306B of the connector 300 is configured to be electrically coupled to a respective balun (for example, one of the baluns 108A-108D of FIGS. 1A-1D). Each contact 302A and 302B is configured to be electrically coupled to a respective pair of the radiating element traces 202A-202D (i.e., the antenna pairs of antenna paths 210A, 210D and 210B, 210C) of the antenna face 200.

The dual balun connector 300, as compared to, for example, a singular balun connector for each antenna pair, provides a more compact solution due to the flexible PWB 301 (which may be advantageous in implementations where the antenna system 100 is implemented as a small-scale antenna system), cheaper, and/or provide for simple assembly during construction (as opposed to multiple connectors).

Figure 3C:
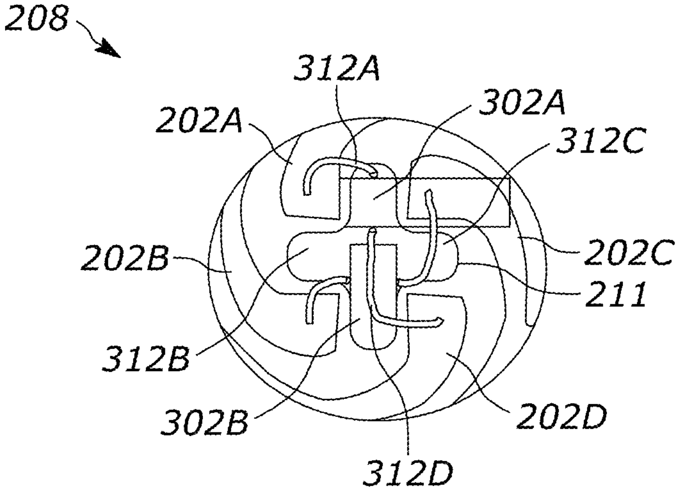
FIG. 3C is a partial view of a center of the antenna face of FIG. 2 according to some implementations.

FIG. 3C illustrates the center 208 of the antenna face 200 and the contacts 302A and 302B of the connector 300 disposed on the opposite side of the antenna face 200. As illustrated, in some implementations, the antenna face 200 includes a cutout 211 at the center 210. In some examples, the cutout 211 is cross-shaped. Such a configuration may allow for easier access to the contacts 302A and 302B during assembly of the antenna system 100. In the illustrated implementation, the first pair of antenna paths (antenna paths 210A and 210D) are both electrically connected to one contact (contact 302A) and the second pair 212B of antenna paths (antenna paths 210B and 210C) are both electrically connected to the other contact (contact 302B). Such connections may be made, for example, via one or more conductive wires (for example, wires 312A and 312D for the first pair of antenna paths 210A and 210D and wires 312B and 312C for the second pair of antenna paths 210B and 212C). Such wires 312A-312D may be, for example, copper.

Thus, each antenna pair is electrically coupled to a respective balun (for example, balun 108A and balun 108B) via a respective trace 310A and 310B of the dual balun connector 300. Each balun may be connected to a respective, individual antenna feed line (not shown) for exchange of communications to and from the respective pair of antenna paths.

Figure 4:
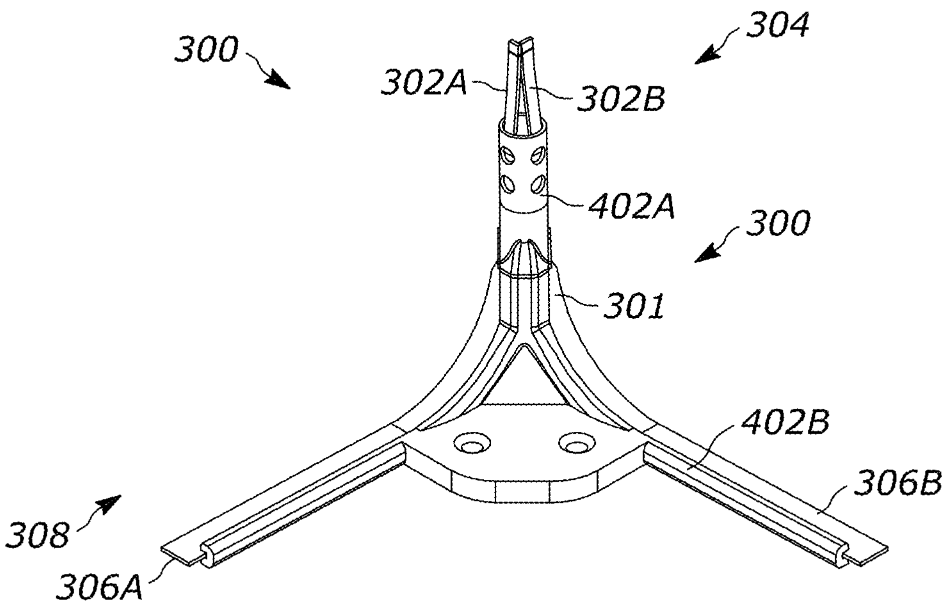
FIG. 4 is a guide for the dual balun connector of FIGS. 3A and 3B according to some implementations.

The dual balun connector 300 may be physically supported by one or more components of the antenna system 100. For example, in some implementations, the antenna system 100 includes a connector support guide 400 as illustrated in FIG. 4. The guide 400, in the illustrated example, includes a first guide structure 402A configured to direct the contacts 302A and 302B of the connector 300 upward toward the center 210 (in particular, the cutout 211) of the antenna face 200. The guide 400 also includes a second guide structure 402B configured to direct the contacts 306A and 306B outward toward an edge of the housing 102 of the antenna system 100. In some implementations, the second guide structure 402B is configured to direct the first contact 306A outward toward a first side of the housing 102 and to direct the other contact 306B outward toward a second edge of the housing 102. In some implementations, the second guide structure 402B is configured to direct both contacts 306A and 306B toward a same edge of the housing 102. In some implementations, the guide 400 is composed of resin.

Returning to FIGS. 1B and 1C, the antenna system 100 includes the center shelf 600. The center shelf 600 is disposed within the housing 102 of the antenna system 100. The center shelf 600 defines a first antenna cavity 106A and a second antenna cavity 106B within the housing 102, each antenna cavity 106A, 106B backing a respective antenna face 200A, 200B. The first antenna cavity 106A and the second antenna cavity 106B, in some implementations, are each configured to suppress backward radiation from the respective antenna faces 200A and 200B. In some implementations, the antenna cavities 106A and 106B each include an absorber 109A and 109B, respectively. In some implementations, the first antenna cavity 106A and the second antenna cavity 106B are both the same size. In some implementations, the first antenna cavity 106A and the second antenna cavity 106B are different sizes. As also illustrated in FIGS. 1B, 1C, and 5A, the antenna system 100 may also include one or more mounting columns 110 configured to support the antenna face(s) 200, the housing 102, and the center shelf 600.

Figure 5A:
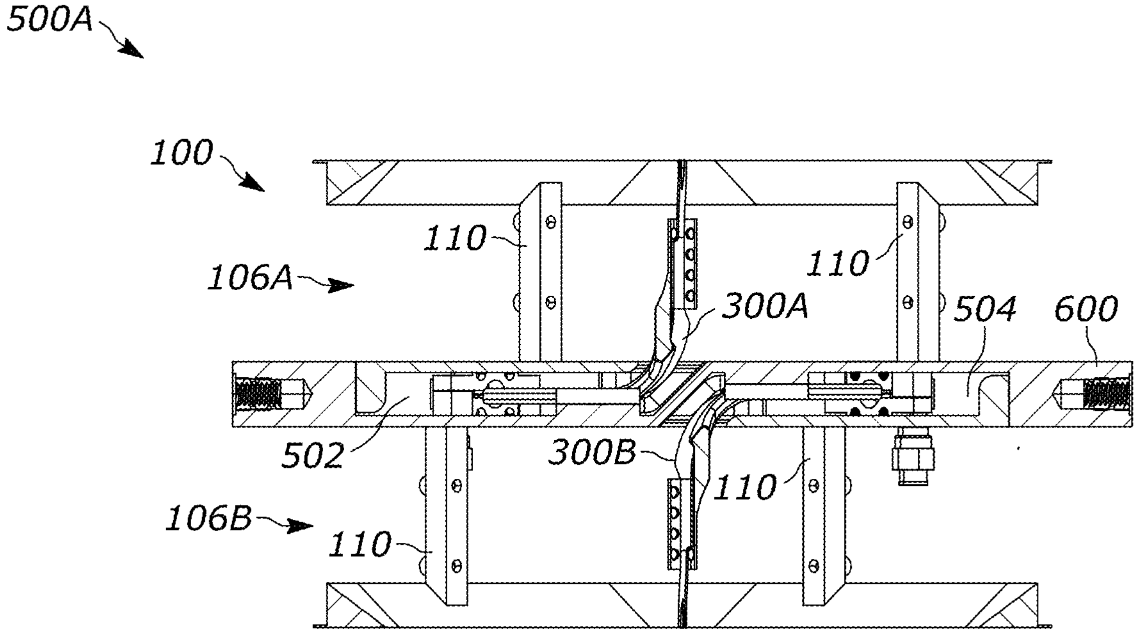
FIG. 5A is a cross-section view of the dual polarization antenna system of FIGS. 1A-1D without the housing according to some implementations.
Figure 5B:
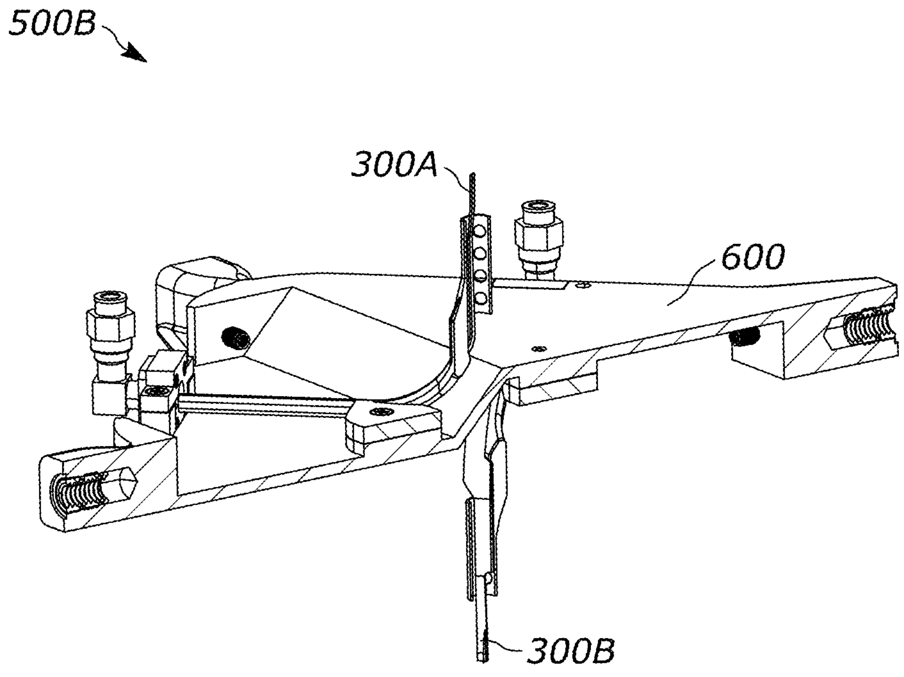
FIG. 5B is a cross-section of the center shelf of FIG. 5A according to some implementations.

FIG. 5A is a cross-section view 500A of the antenna system 100 without the housing 102 in accordance with some implementations. FIG. 5B is a cross-section view 500B of the cross-section view 500A of FIG. 5A. In some implementations, the center shelf 600 includes one or more connector cavities (for example, cavities 502 and 504) each configured to receive one or more dual balun connectors (for example, the connectors 300A and 300B) and, in some implementations, a respective support guide (for example, guides 400A and 400B). In some implementations, the center shelf 600 is composed of two or more different portions (for example, a half portion as shown in FIG. 5B) that, when combined, form the one or more cavities 502, 504.

In implementations where there is only a single antenna face 200, the center shelf 600 may alternatively be disposed at the bottom of the housing 102 of the antenna system 100 and may define a single antenna cavity backing the antenna face 200.

Figure 6:
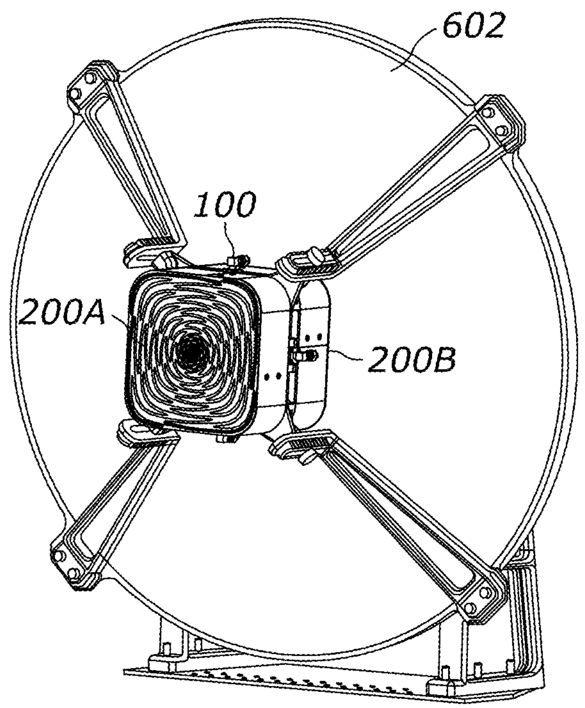
FIG. 6 is an example application of the dual polarization antenna system of FIGS. 1A-1D according to some implementations.

FIG. 6 illustrates an example application of the antenna system 100 of FIGS. 1A-1D in accordance with some implementations. As illustrated, the antenna system 100 (in implementations where dual, opposite-facing antenna faces 200A and 200B are included in the system 100) may be utilized with a reflector (for example a dish reflector 602) such that the radio frequency transmission and/or reception ranges of both antenna faces 200A and 200B generally emit in the same direction. The front-facing antenna face 200A may be configured to transmit and/or receive radio frequency communications within a first beamwidth (for example, a narrow beamwidth) while the rear-facing antenna face 200B (with use of the reflector 602) may be configured to transmit and/or receive radio frequency communications within a second beamwidth (for example, a broad beam width). As an example, the antenna face 200A may have a beamwidth of 85 degrees and the rear-facing antenna face 200B (with use of the reflector 602) may have a beamwidth of approximately 40 degrees at 0.7 GHz down to 2 degrees at 18 GHz.

In some implementations, the front-facing antenna face 200A and the rear-facing antenna face 200B are operated as a radio frequency direction finding (DF) and/or angle of arrival (AOA) system. For example, the front-facing antenna face 200A may have 85 degree beam and the rear-facing antenna face 200B may have a 30 degree beam at a particular frequency. As both beams from the faces 200A and 200B are pointing in the same direction, both beams have the same angle axes. The front face beam of 85 deg has less amplitude roll-off compared to the rear face beam of 30 deg. The difference between an amplitude of a measured beam received at the antenna face 200A and an amplitude of the measured beam received at the antenna face 200B may be used to estimate the angle where an emitter of the measured beam is coming to the antenna system 100 (i.e., the AOA) (for example, according to a lookup table).

In some implementations, the front-facing antenna face 200A may be operated as a wide beam transmitter while the rear-facing antenna face 200B (with the reflector 605) is operated as a narrow beam transmitter. In some implementations, the front-facing antenna face 200A and 200B may each be operated as two channel receivers, each face 200A, 200B being configured to receive both horizontal polarization and vertical polarization signals.

Figure 7:
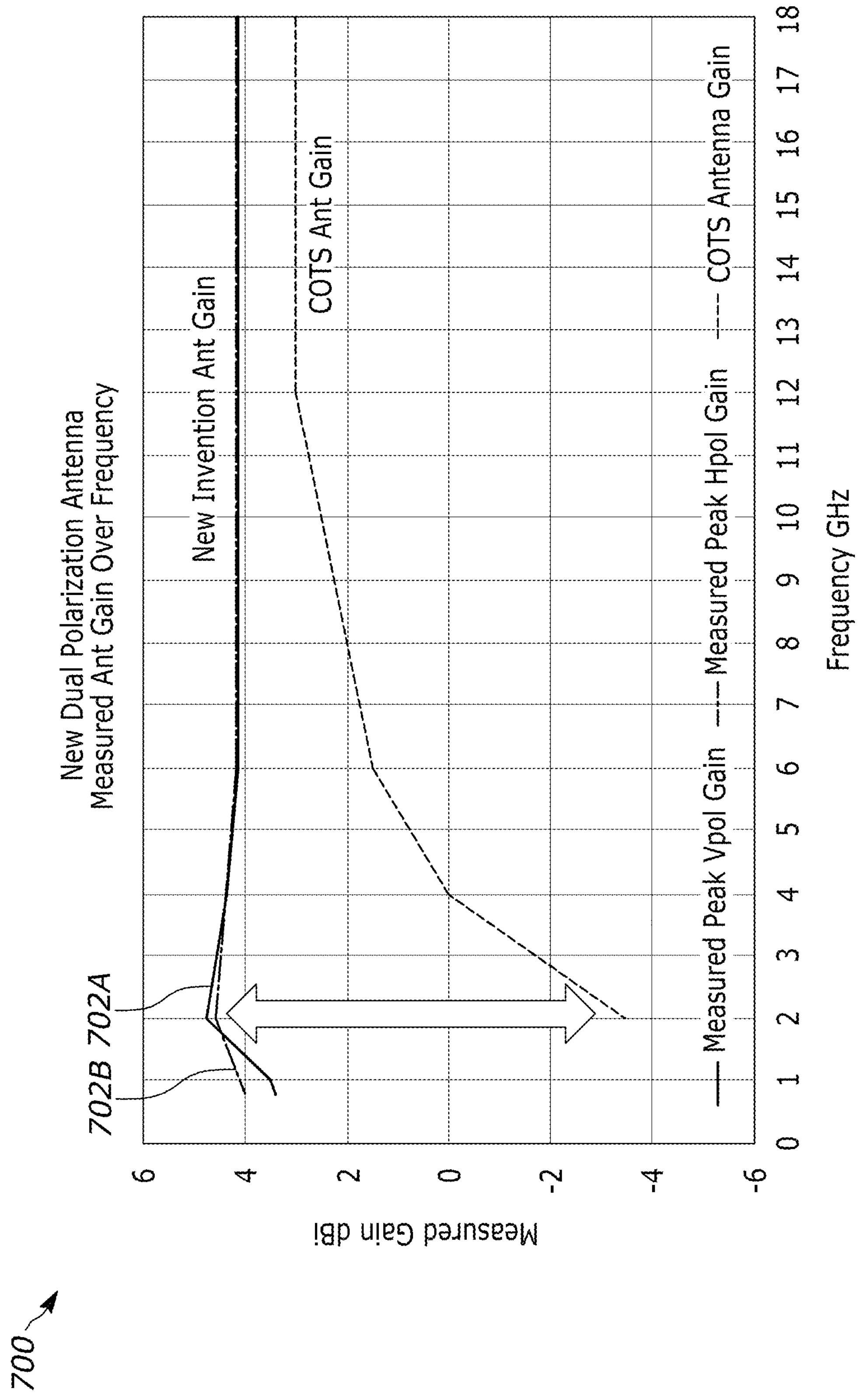
FIG. 7 is graph of an antenna gain performance of the dual polarization antenna system of FIGS. 1A-1D according to some implementations.

The antenna system 100, as described above, is an UWB antenna system. For example, in some implementations, the antenna system 100 has a bandwidth ratio of 25/7 (with constant beamwidth). FIG. 7 is a graph 700 of the vertical gain 702A and horizontal gain 702B of the antenna system 100 in accordance with some implementations. As illustrated, the antenna system 100 has an instantaneous (real-time) bandwidth of 0.7 GHz-18 GHz.

In the foregoing specification, specific implementations have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

Various features and advantages of the implementations described herein are set forth in the following claims.

What is claimed is:

1. An ultra-wideband dual polarization antenna system comprising:

a first rounded-cornered square planar antenna face;

a first plurality of radiating element traces, each of the first radiating element traces extending flexuously in a rounded zig-zag pattern increasing in amplitude over a geometric distance from a center of the first rounded-cornered square planar antenna face to a corner edge of the first rounded-cornered square antenna face, and a first plurality of ridged antenna elements electrically coupled to each of the first plurality of radiating element traces extending upward from the first rounded-cornered square planar antenna face, each of the first plurality of ridged antenna elements being positioned along an edge of the first rounded-cornered square planar antenna face.

2. The antenna system of claim 1, wherein a first pair of the first plurality of radiating element traces are electrically coupled to a first balun via a first dual balun connector and a second pair of the first plurality of radiating element traces are electrically coupled to a second balun via the first dual balun connector.

3. The antenna system of claim 2, wherein the first dual balun connector is disposed within a housing of the antenna system.

4. The antenna system of claim 3, wherein the housing defines an antenna cavity of the first rounded-cornered square antenna face.

5. The antenna system of claim 4, wherein the first balun and the second balun are positioned outside of the housing.

6. The antenna system of claim 2, wherein the first dual balun connector includes a flexible printed wiring board.

7. The antenna system of claim 1, wherein the first plurality of ridged antenna elements include sawtooth-shaped ridges.

8. The antenna system of claim 1, wherein a bandwidth ratio of the antenna system is 25/7.

9. The antenna system of claim 1, the antenna system further comprising:

a second rounded-cornered square planar antenna face;

a second plurality of radiating element traces, each of the second radiating element traces extending flexuously in a rounded zig-zag pattern increasing in amplitude over a geometric distance from a center of the second rounded-cornered square planar antenna face to a corner edge of the second rounded-cornered square antenna face; and a second plurality of ridged antenna elements electrically coupled to each of the second plurality of radiating element traces extending upward from the second rounded-cornered square planar antenna face, each of the second plurality of ridged antenna elements being positioned along each edge of the second rounded-cornered square planar antenna face.

10. The antenna system of claim 9, wherein a first pair of the second plurality of radiating element traces are electrically coupled to a third balun via a second dual balun connector and a second pair of the second plurality of radiating element traces are electrically coupled to a fourth balun via the second dual balun connector.

11. The antenna system of claim 10, wherein the second dual balun connector is disposed within a housing of the antenna system.

12. The antenna system of claim 11, wherein the housing includes an antenna cavity of the second rounded-cornered square antenna face.

13. The antenna system of claim 12, wherein the housing includes a center shelf disposed within the housing, the center shelf being disposed between the antenna cavity of the second rounded-cornered square antenna face and an antenna cavity of the first rounded-cornered square antenna face.

14. The antenna system of claim 13, wherein the center shelf includes one or more cavities configured to receive the first dual balun connector and the second dual balun connector.

15. The antenna system of claim 10, wherein the second dual balun connector includes a flexible printed wiring board.

16. The antenna system of claim 9, wherein the second plurality of ridged antenna elements include sawtooth-shaped ridges.

17. The antenna system of claim 9, wherein a bandwidth ratio of the antenna system is 25/7.

18. The antenna system of claim 9, wherein a field of view of the second rounded-cornered square antenna face is in a direction opposite to that of a field of view of the first antenna face.

19. The antenna system of claim 18, wherein the first rounded-cornered square antenna face is operated as a narrow band beam antenna and the second rounded-cornered square antenna face is operated as a wide beam antenna.

20. The antenna system of claim 19, wherein the antenna system is part of a radio frequency direction finding (DF) and/or angle of arrival (AOA) system.

* * * * *